United States Patent
Abbinante (10) Patent No.: US 9,496,666 B2
(45) Date of Patent: Nov. 15, 2016

(54) AIRCRAFT POWER AND DATA DISTRIBUTION SYSTEM AND METHODS OF PERFORMING THE SAME

(71) Applicant: Rob Abbinante, Chicago, IL (US)

(72) Inventor: Rob Abbinante, Chicago, IL (US)

(73) Assignee: ARMSTRONG AEROSPACE, INC., Itasca, IL (US)

( * ) Notice: Subject to any disclaimer, the term of this patent is extended or adjusted under 35 U.S.C. 154(b) by 0 days.

(21) Appl. No.: 14/593,108

(22) Filed: Jan. 9, 2015

(65) Prior Publication Data

US 2015/0194776 A1   Jul. 9, 2015

Related U.S. Application Data

(60) Provisional application No. 61/925,322, filed on Jan. 9, 2014.

(51) Int. Cl.
| | |
|---|---|
| *H01R 13/60* | (2006.01) |
| *H01R 24/78* | (2011.01) |
| *B64D 11/00* | (2006.01) |
| *B64D 11/06* | (2006.01) |
| *H01R 107/00* | (2006.01) |
| *H01R 24/60* | (2011.01) |
| *H01R 27/02* | (2006.01) |

(52) U.S. Cl.
CPC .......... *H01R 24/78* (2013.01); *B64D 11/0015* (2013.01); *B64D 11/0624* (2014.12); *B64D 2221/00* (2013.01); *H01R 24/60* (2013.01); *H01R 27/02* (2013.01); *H01R 2107/00* (2013.01); *H01R 2201/26* (2013.01); *Y10T 29/49002* (2015.01)

(58) Field of Classification Search
CPC .............. B64D 11/06; B64D 11/0602; B64D 11/0624; B60N 3/00
USPC ................................ 439/34, 532, 535, 540.1
See application file for complete search history.

(56) References Cited

U.S. PATENT DOCUMENTS

| | | | |
|---|---|---|---|
| 4,853,555 | A | 8/1989 | Wheat |
| 5,409,186 | A | 4/1995 | Chow |
| 5,555,458 | A | 9/1996 | Large |
| 5,795,018 | A | 8/1998 | Schumacher et al. |
| 6,340,868 | B1 | 1/2002 | Lys et al. |
| 6,572,054 | B1 | 6/2003 | Smallhorn |
| 6,585,189 | B1 | 7/2003 | Smallhorn |
| 6,601,798 | B2 | 8/2003 | Cawley |
| 6,619,588 | B2 * | 9/2003 | Lambiaso .......... B64D 11/0015 244/118.5 |
| 6,644,593 | B2 | 11/2003 | Lambiaso |
| 6,743,976 | B2 | 6/2004 | Motzigkeit |
| 6,824,104 | B2 | 11/2004 | Smallhorn |
| 6,843,681 | B2 | 1/2005 | Sanner |
| 6,860,554 | B2 | 3/2005 | Lambiaso |
| 6,863,344 | B2 | 3/2005 | Smallhorn |
| 6,899,396 | B2 | 5/2005 | Bales |
| 6,921,987 | B2 | 7/2005 | Marin-Martinod |
| 7,143,978 | B2 * | 12/2006 | Smallhorn ......... B64D 11/0624 244/118.5 |
| 7,188,805 | B2 | 3/2007 | Henley et al. |
| 7,221,104 | B2 | 5/2007 | Lys et al. |
| 7,503,522 | B2 | 3/2009 | Henley et al. |

(Continued)

*Primary Examiner* — Vanessa Girardi
(74) *Attorney, Agent, or Firm* — Vedder Price P.C.

(57) ABSTRACT

A electrical distribution unit comprising a housing, a securing unit connected to the housing and to a seat track in an aircraft, at least one outlet unit on the housing, an electronic connection unit in the housing that is connected to a power distribution system, and where the outlet unit is electronically connected to the electronic distribution unit to provide power to a device connected to the at least one outlet unit.

20 Claims, 7 Drawing Sheets

(56) References Cited

U.S. PATENT DOCUMENTS

| | | |
|---|---|---|
| 7,525,254 B2 | 4/2009 | Lys et al. |
| 7,598,686 B2 | 10/2009 | Lys et al. |
| 7,610,783 B2 | 11/2009 | Rudduck et al. |
| 7,710,288 B2 | 5/2010 | Seguchi et al. |
| 7,930,004 B2 | 4/2011 | Seil et al. |
| 2003/0076281 A1 | 4/2003 | Morgan et al. |
| 2007/0182534 A1 | 8/2007 | Gregory |
| 2009/0237245 A1 | 9/2009 | Brinton et al. |

\* cited by examiner

AIRCRAFT POWER AND DATA DISTRIBUTION SYSTEM AND METHODS OF PERFORMING THE SAME

RELATED APPLICATIONS

This application is a non-provisional application that claims the benefit of and the priority from U.S. Provisional Application No. 61/925,322 filed Jan. 9, 2014, titled "AIRCRAFT POWER AND DATA DISTRIBUTION SYSTEM AND METHODS OF PERFORMING THE SAME".

BACKGROUND OF THE INVENTION

Many passengers of commercial aircraft use their computers and other electronic devices for work or recreational purposes while in flight to their destination. However, use of such electronic devices is limited during flights which may last longer than the remaining battery life of the passenger's electronic device. Accordingly, commercial passenger aircraft companies acknowledge the need to provide electrical power to electronic devices used by its passengers.

Electrical power has been available to passengers from electronic power outlets located on the passenger seats or in other convenient locations. A passenger power outlet system employs a power conversion device that converts the aircraft power, typically available at 115 volts and at a frequency of 400 hertz (Hz), to the voltage and frequency that is used by passenger's electronic devices, typically at 110-120 volts and at 60 Hz or 50 Hz. Wiring is then extended from the power conversion device to an electrical power outlet that is readily accessible by the passenger.

Such prior passenger power outlet systems attach one or more portions of the passenger power outlet system to the passenger seat and/or to the seat supports. For example, the wiring between the electronic outlet and the power conversion device may be secured to the passenger seat supports and other support structure.

Safety regulations stipulate that the passenger's electronic devices must be shut off, unplugged and stowed during certain phases of flight, such as during takeoff and landing. Accordingly, the passenger's electronic devices should not be drawing power from the passenger power outlet system, and preferably, should be entirely disconnected from the passenger power outlet system. Accordingly, a power-in-use indicator, such as a light or the like, is employed by the passenger power outlet system so that a flight attendant can visually detect use of the passenger power outlet system.

The power-in-use indicator is typically secured to, and/or incorporated into, the aisle-way passenger seat at a location that is readily visible to the flight attendant. Thus, prior to landing or taking off, the flight attendant can walk down the passenger aisle and quickly determine if one or more of the passenger's electronic devices are drawing power from the passenger power outlet system (and thus, may request the passenger to disconnect their electronic device from the passenger power outlet system).

Considerable regulatory overview and approval is required for all aspects of aircraft structure, and particularly modifications made thereto, so as to ensure aircraft safety. In particular, any modification to a passenger seat must be submitted for approval, and then be approved, by one or more appropriate regulatory agencies. Thus, the power-in-use indicator light that is attached to, or secured to, the passenger seat must be pre-approved by the appropriate regulatory agencies.

During initial fitting of commercial passenger aircraft with passenger seats, providing a regulatorily compliant passenger power outlet system with the attendant power-in-use indicator light that is attached to the passenger seat is relatively simple to implement. That is, the regulatorily compliant passenger power outlet system is easily installed as part of the process of initially installing the passenger seats into the commercial passenger aircraft.

Retrofitting existing passenger seats with a passenger power outlet system is relatively more complex and expensive. The passenger power outlet system must receive regulatory approval prior to installation, particularly if one or more components of the passenger power outlet system is secured to, or even touching, a passenger seat. An unexpected advance in technology has created an urgent need to retrofit existing commercial passenger aircraft with passenger power outlet systems. The advent of wireless technology, and in particular WiFi technology, allows wireless access to the Internet by IEEE 802.11 compliant devices, such as a laptop computer, a personal device assistant (PDA), a cell phone, a game device, or the like. That is, a passenger can now wirelessly access the Internet or inflight entertainment content through a WiFi hub device that has been installed in the commercial passenger aircraft.

Passengers are willing to pay a premium service charge for wireless Internet access during their flight. However, when the battery life of the passenger's electronic device is substantially less than the duration of the flight, the passenger will likely be reluctant to pay the premium service charge. Additionally, airlines risk having a surge of customer service problems if passenger electronic devices cannot be used for the duration of the flight.

Accordingly, there is a need to provide an improved regulatorily compliant retrofit passenger power outlet system that is readily installed in an existing operational commercial passenger aircraft so that the commercial passenger aircraft companies can take advantage of this new economic opportunity. Further, it is highly desirable to have a regulatorily compliant retrofit passenger power outlet system suitable for immediate installation in commercial passenger aircraft without the need for extensive regulatory oversight and approval of the appropriate regulatory organizations, which may take a considerable amount of time and effort on the part of the supplier of the passenger power outlet system.

SUMMARY OF THE INVENTION

One embodiment of the present invention includes an electrical distribution unit comprising a housing, a securing unit connected to the housing and to a seat track in an aircraft, at least one outlet unit on the housing, an electronic connection unit in the housing that is connected to a power distribution system, where the outlet unit is electronically connected to the electronic distribution unit to provide power to a device connected to the at least one outlet unit.

In another embodiment, each outlet unit may be removably attached to the housing.

In another embodiment, at least one outlet unit may be attached to a surface of the housing facing the nose of the aircraft when installed.

In another embodiment, at least one outlet unit may be attached to a surface of the housing facing the tail of the aircraft.

In another embodiment, at least one outlet unit may include a Universal Serial Bus connection.

In another embodiment, at least one outlet unit may be attached to a surface of the housing facing the nose of the aircraft when installed.

In another embodiment, the securing unit is not in contact with the aircraft seat.

In another embodiment, each outlet unit may include a data connection.

In another embodiment, the housing unit may be removably affixed to the securing unit.

In another embodiment, the electrical distribution unit may include a lighting unit positioned on a top portion of the front surface of the housing above the outlet units.

Another embodiment includes a method of providing electrical power to passengers on an aircraft that includes the steps of providing an electronic connection unit in an internal cavity of a housing, connecting the electronic connection unit to a power distribution system, affixing at least one outlet unit to at least one surface of the housing affixing the a securing unit to the housing, affixing the securing unit to a seat track in an aircraft, providing power from the power distribution system to a device connected to the at least one outlet unit.

In another embodiment, each outlet unit may be removably attached to the housing.

In another embodiment, at least one outlet unit may be attached to a surface of the housing facing the nose of the aircraft when installed.

In another embodiment, at least one outlet unit may be attached to a surface of the housing facing the tail of the aircraft.

In another embodiment, at least one outlet unit may include a Universal Serial Bus connection.

In another embodiment, at least one outlet unit may be attached to a surface of the housing facing the nose of the aircraft when installed.

In another embodiment, the securing unit is not in contact with the aircraft seat.

In another embodiment, each outlet unit may include a data connection.

In another embodiment, the housing unit may be removably affixed to the securing unit.

In another embodiment, the electrical distribution unit may include a lighting unit positioned on a top portion of the front surface of the housing above the outlet units.

DETAILED DESCRIPTION OF THE INVENTION

Figure 1:
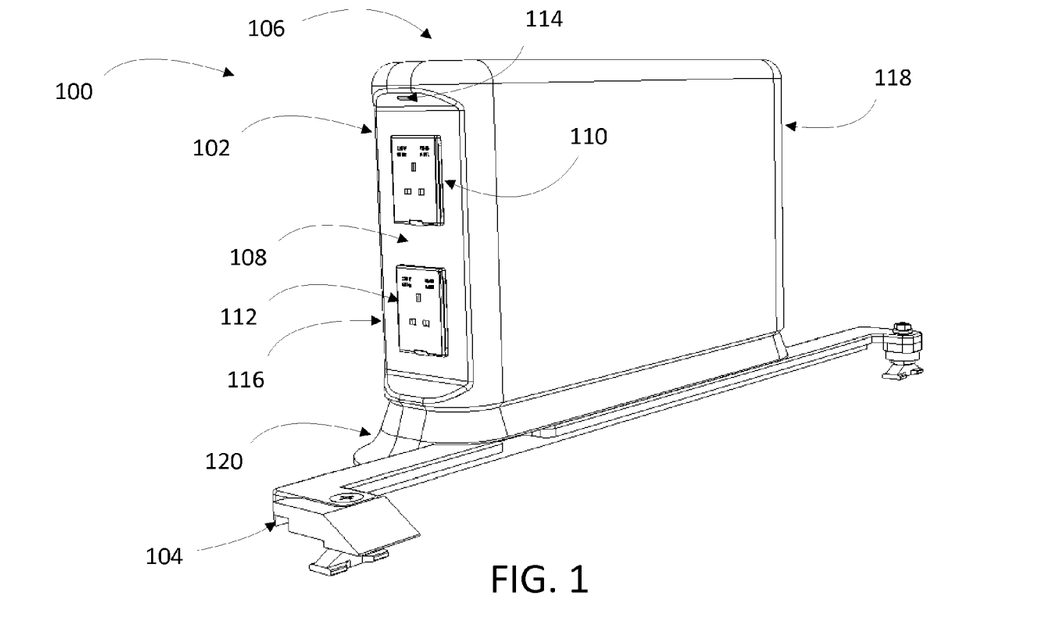
FIG. 1 depicts a rear view of one embodiment of a track mounted enclosure housing electronic components that is consistent with the present invention.

FIG. 1 depicts a rear view of one embodiment of a track mounted enclosure housing electronic components 100 that is consistent with the present invention. The track mounted enclosure 100 includes an electronic distribution unit ("EDU") 102 and a securing unit 104. The EDU 102 includes an enclosure 106, a connection plate 108 connected to the enclosure 106, a first outlet unit 110 and second outlet unit 112 removably affixed to the connection plate 108. The outlet units 110 and 112 may be any known outlet type including, but not limited to, a conventional three prong 115 VAC plug, a Universal Serial Bus ("USB") connector, a data connector such as an RJ-45 jack, a mini USB connector, or any other type of power or data outlet. A light unit 114 may be positioned on the connection plate 108 or above the connection plate 108 on an angled surface. The light unit 114 may be any type of light including a light emitting diode, incandescent light or any other type of light. The light unit 114 is positioned such that the light illuminates the surface of the outlet units 110 and 112.

The enclosure 106 is made from a rigid material such as hard plastic, steel, aluminum a composite material or any other rigid material. In one embodiment, the rear side 116 of the enclosure 106 has a smaller height than the front side 118 of the enclosure 106. In another embodiment, the height of the rear side 116 of the enclosure 106 is substantially the same height as the front side 118 of the enclosure 106. The lower side 120 of the enclosure 106 is removably affixed to the securing unit 104 such that the enclosure 106 may be removed from the securing unit 104 by lifting the enclosure 106 away from the securing unit 104. In one embodiment, the securing unit 104 is connected to the centerline of the lower side 120 of the enclosure 106. In another embodiment, the securing unit 104 is connected to one side of the lower side 120 of the enclosure 106.

Figure 2:
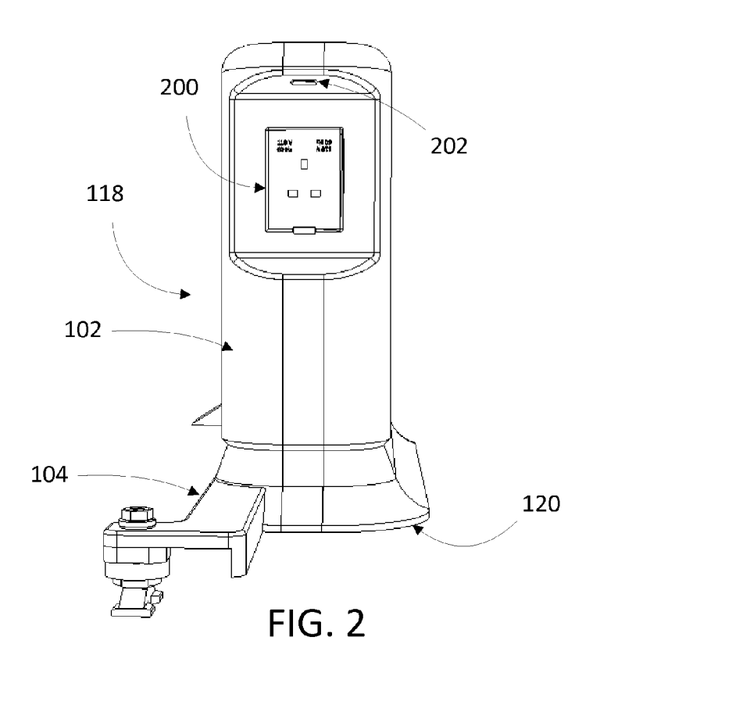
FIG. 2 depicts a front view of an electronic distribution unit.

FIG. 2 depicts a front view of the EDU 102 of FIG. 1. The front side 118 of the enclosure 106 includes a third outlet unit 200 removably connected to the front side 118 of the enclosure 106. A light unit 202 may be positioned on an angled surface above the outlet unit 200. The light unit 202 may be any type light including light emitting diodes, incandescent light or any other type of light. The light unit 202 is positioned such that the light illuminates the surface of the outlet unit 200.

In one embodiment, the front side 118 of the enclosure 106 is substantially vertical. In another embodiment, the front side 118 of the enclosure 106 is angled towards the rear side 116 of the enclosure 106 by a predefined angle. In another embodiment, the front side 118 of the enclosure 106 is angled away from the rear side 116 of the enclosure 106 by a predefined angle. The first outlet unit 110, second outlet unit 112 or third outlet unit 200 may be conventional 115 VAC power outlets that include an indicator light indicating that the outlet is powered. In another embodiment, the first outlet unit 110, second outlet unit 112 and third outlet unit 200 may be a data connector such as an RJ-45 data connection jack. In another embodiment, each of the first outlet unit 110, second outlet unit 112 and third outlet unit 200 provides an alternating current (AC) power signal to a device. In another embodiment, each of the first outlet unit 110, second outlet unit 112 and third outlet unit 200 provides a direct current (DC) power signal to a device. In another embodiment, each of the first outlet unit 110, second outlet unit 112 and third outlet unit 200 provides an AC power signal and a DC power signal to a device. In another embodiment, each of the first outlet unit 110, second outlet unit 112 and third outlet unit 200 are the same type of outlet. In another embodiment, each of the first outlet unit 110, second outlet unit 112 and third outlet unit 200 are each different types of outlets. In another embodiment, the enclosure 106 may house a 802.11 wireless access point.

Figure 3:
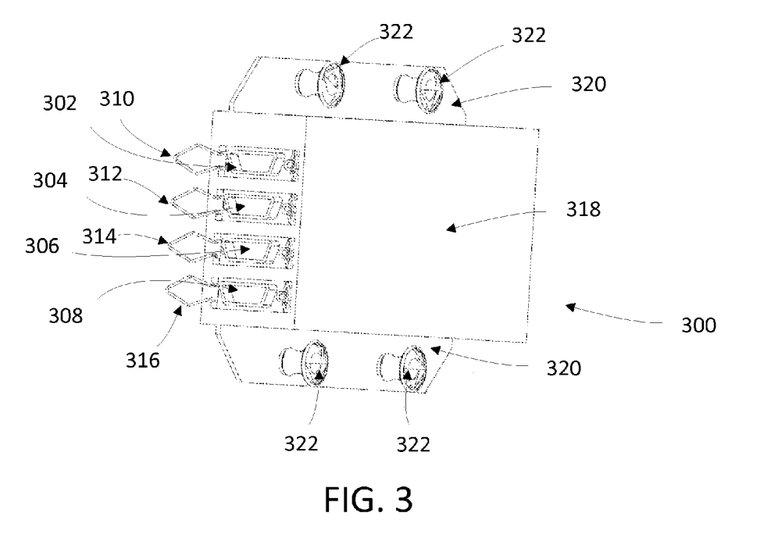
FIG. 3 depicts a perspective view of the electronic connection unit.

FIG. 3 depicts a perspective view of the electronic connection unit 300. The electronic connection unit 300 includes a first port 302, second port 304, third port 306 and fourth port 308. Each port 302, 304, 306 and 308 is configured to connect to an outlet unit 110, 112 or 200 to provide converted power or data to the outlet units 110, 112 or 200. One or more ports 302, 304, 306 or 308 may be connected to the light units 114 or 202. Ports on the back of the unit (not shown) are connected to source signal lines such as a power line or a data signal line. A power signal line may be a 115 VAC power signal line, a 28 VDC or any other type of power signal line. The data signal line may be an Ethernet data signal line, a TCP/IP data signal, an audio data signal line or any other data signal line. The electronic connection unit 300 is configured to connect a respective outlet unit 110, 112 or 200 to an appropriate data or power signal line. As an illustrative example, if the first outlet unit 110 is a 115 VAC outlet and the second outlet unit 112 is an RJ45 data outlet, the electronic connection unit 300 will connect first outlet unit 110 to a 115 VAC power signal line and the second outlet unit 112 to a data signal line. To accomplish these connections, the electronic connection unit 300 may include a microprocessor running a program that determines the signal required by each outlet unit 110, 112 and 200 and which routes the correct signal to the correct outlet unit 110, 112 or 200.

Each port 302, 304, 306 and 308 includes a locking unit 310, 312, 314 and 316. Each locking unit 310, 312, 314 and 316 is configured to engage a connector that connects to port 302, 304, 306 or 308 to lock the connector against the port 302, 304, 306 and 308. Each connector may be connected directly to a first, second or third outlet unit 110, 112 or 200 to provide power or data to the outlet unit 110, 112 or 200.

The electronic connection unit 300 is housed in a case 318. The case 318 includes flanges 320 extending from a lower portion of the case 318. The flanges 320 include holes (not shown) configured to accommodate securing units 322 with the securing units 322 engaging the interior sidewalls of the enclosure 106 to secure the electronic connection unit 300 in the cavity of the enclosure 106.

The electronic connection unit 300 may include protection circuitry to prevent the over-charging, short-circuiting or overheating of the electronic connection unit 300. Further, the electronic connection unit 300 may include a microprocessor that is programmed to detect the amount of voltage and current needed for a device connected to an outlet unit 110, 112, or 200 to charge. As an illustrative example, if the first outlet unit 110 includes a plug for a laptop computer, the electronic connection unit 300 may provide 115 VAC power to the first outlet unit 110 via the port 302, 304, 306 and 308 connected to the first outlet unit 110. Simultaneously, if the second outlet unit 112 includes a USB connection, the electronic connection unit 300 may transmit a USB power signal to the second outlet unit 112 via the port 302, 304, 306 or 308 connected to the second outlet unit 112. By including the connection unit detection logic, the outlet units 110, 112 and 200 may be replaced without reconfiguring the electronic connection unit 300.

Each of the outlet units 110, 112 and 200 may include an electronic identifier, such as an identification number or address, that is transmitted to the electronic connection unit 300 via the wire connecting the electronic connection unit 300 to the outlet unit 110, 112 and 200. The microprocessor in the electronic connection unit 300 may consult a table stored in the memory of the electronic connection unit 300 to determine the correct power or data signal to transmit to the outlet unit 110, 112 or 200 based on the identifier. Further, the electronic connection unit 300 may open and close internal switches to route the correct power or data signal from the source signal lines connected to the electronic connection unit 300 to the outlet unit 110, 112 or 200 based on the outlet unit 110, 112 or 200 identification.

The electronic connection unit 300 is configured such that it can simultaneously provide power or data signals to three devices connected to the outlet units 110, 112 and 200. The electronic connection unit 300 may include power load distribution logic programmed into the microprocessor in the electronic connection unit 300 to equally distribute the power drawn from the power line. The load distribution logic may allocate the required amount of power to each of the outlet units 110, 112 or 200 based on the type of device or battery connected to the connection port.

Figure 4A:
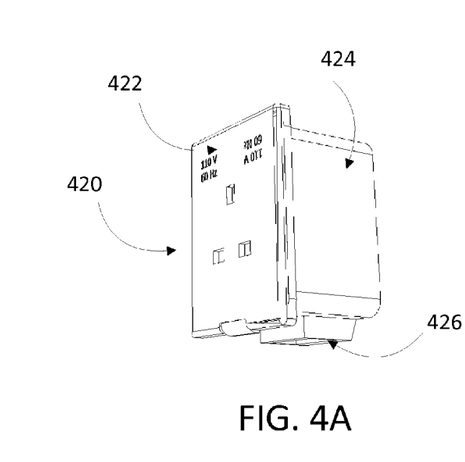
FIG. 4A depicts one embodiment of an outlet unit.

FIG. 4A depicts one embodiment of an outlet unit 420. The outlet unit 420 includes a face plate 422, a unit housing 424 and a connector 426. The face plate 422 may include markings to indicate the type of power signal provided from the outlet unit 110, 112 or 200. The housing 424 contains all of the circuitry required to provide power from the power connector 426 to the outlet. The housing 424 may also include a microprocessor that provides information, such as the connector identifier, to the electronic connection unit 300. The connector 426 may be any known connector capable of connecting a cable to the housing for the transmission of a power signal and a data signal. The data signal transmitted to the electronic connection unit 300 may be any known data signal and format including a digital switch closure signal, or a communication signal such as ASCII.

Figure 4B:
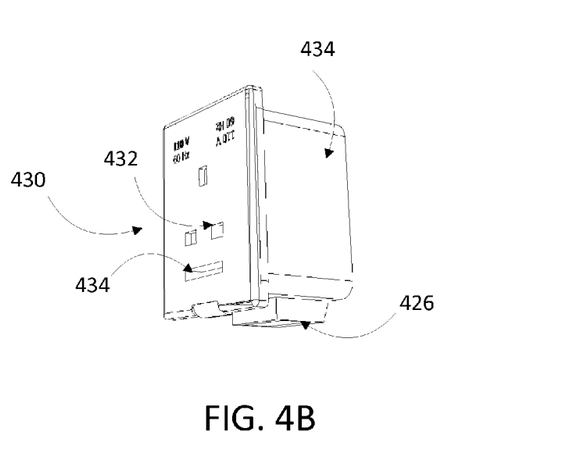
FIG. 4B depicts one embodiment of an outlet unit.

FIG. 4B depicts another embodiment of an outlet unit 430. The outlet unit 430 includes a conventional 115 VAC power outlet 432 and a USB power and data outlet 434. The outlet unit 430 provides power and data one or more of the outlets 432 and 434 when a device is connected to the outlet. The outlet unit 430 detects when a device is connected to the outlet using a switch or via a microprocessor. The outlet unit 430 then transmits a connection signal to the electronic connection unit 300 to request the electronic connection unit 300 transmit the correct power signal or data signal to the outlet unit 430.

In one embodiment, a microprocessor in the housing of the outlet unit 430 senses that a device is connected to one or more of the outlets 432 and 434. The microprocessor can sense the connection of a device using any known methods of sensing a connection including identifying a closed circuit, by the use of a mechanical switch, or by any other known method of sensing a device is connected. When a device is sensed, the microprocessor sends a connection signal to the electronic connection unit 300 which initiates the transfer of the correct power or data signals to the outlet unit 430. Alternatively, the electronic connection unit 300 may monitor the outlets 432 and 434 to determine if a device is connected. If a device is connected, the electronic connection unit 300 transmits the correct power signal or data signals to the outlets 432 and 434. By providing a dual outlet on the outlet unit 430, two devices having different power requirements can be powered simultaneously from the same outlet unit.

Figure 5:
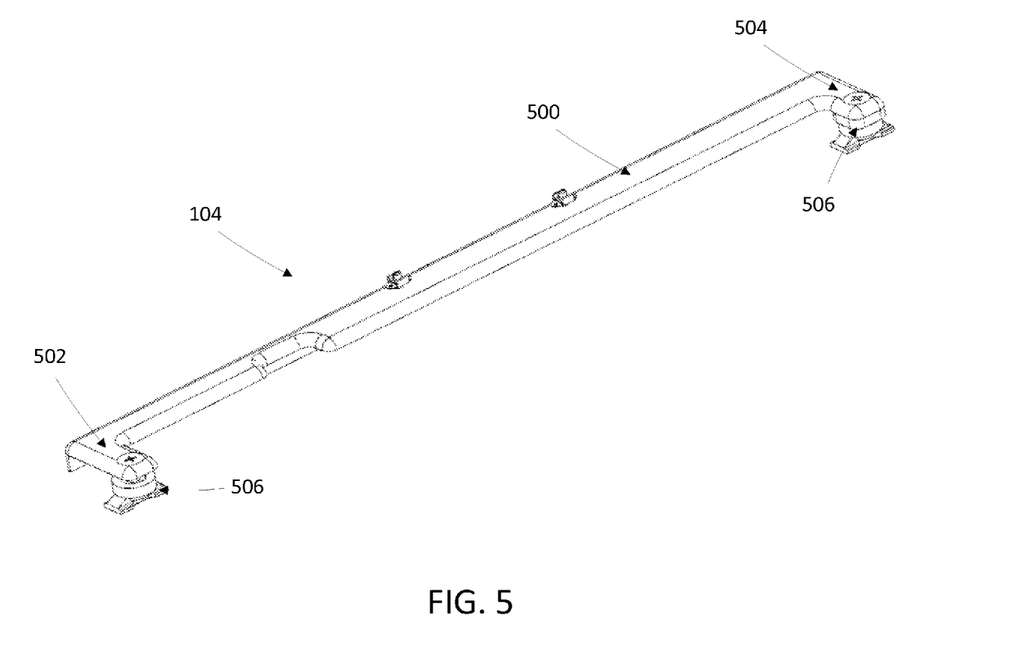
FIG. 5 depicts a perspective view of a securing unit.

FIG. 5 depicts a perspective view of the securing unit 104. The securing unit 104 includes a bar 500 with two connecting extensions 502 and 504 affixed at opposite ends of the bar 500. Attachment units 506 are connected to each of the connecting extensions 502 and 504. The attachment units 506 may be connected to the connecting extensions 502 and 504 using pins, screws, bolts or any other means of attaching the extensions 502 and 504 to the bar 500. The attachment units 506 are configured to engage the seat mounting track in the floor of an aircraft to secure the securing unit 104 to the tracks of the aircraft. The securing unit 104 is sized such that the connecting extension units 502 and 504 and the attachment units 506 are positioned in front of or behind the structural supports of an aircraft seat when the EDU 102 is installed. The securing unit 104 may be made from any rigid material including steel, aluminum, plastic, or any other rigid material.

Figure 6:
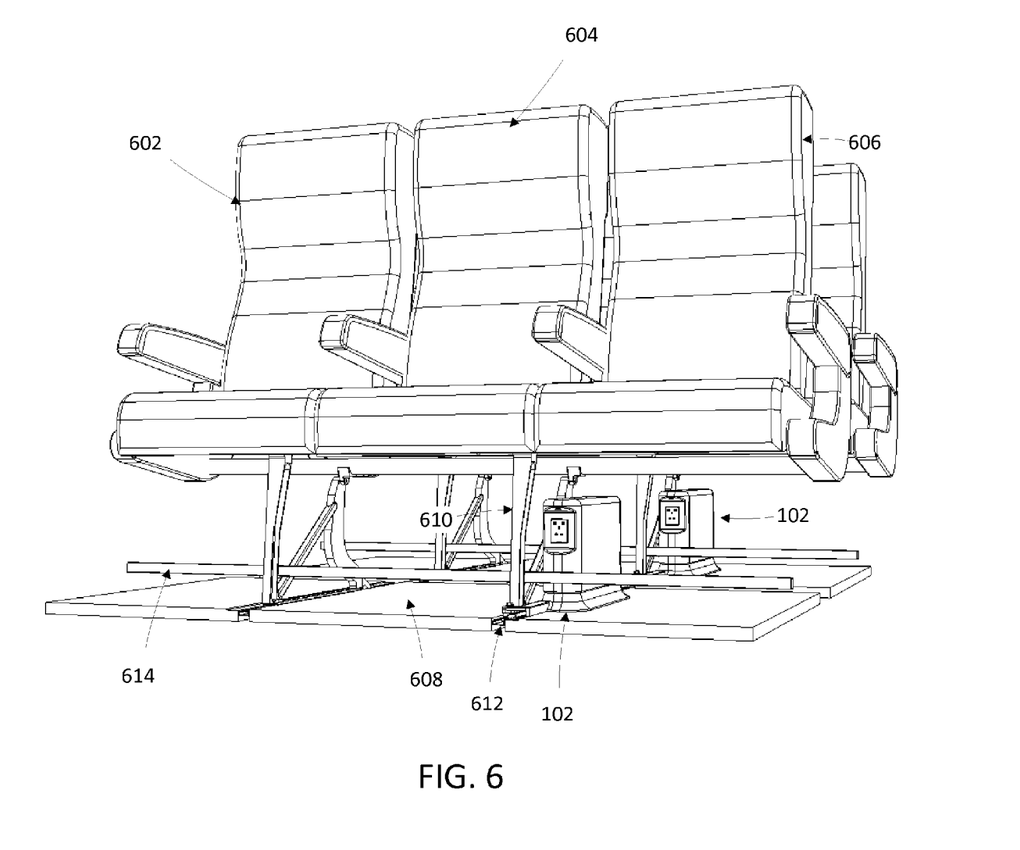
FIG. 6 depicts a perspective view of a track mounted enclosure housing electronic components installed in an aircraft.

FIG. 6 depicts a perspective view of the EDU 102 installed in an aircraft. The passenger seats 602, 604 and 606 are secured to the aircraft cabin floor 608 by attachment to the seat supports 610. The seat supports 610 are secured to the seat tracks 612 in the aircraft floor 608. In the exemplary embodiment, EDU 102 is secured to the seat track 612 in front of the seat support 610, and is therefore between the passenger seat 602 and the wall of the aircraft. In another embodiment, the EDU 102 is between the seat 602 and the aisle of the aircraft. The connecting extensions 502 and 504 are configured such that the EDU 102 is positioned beneath an aircraft seat 602, 604, or 606 without contacting the aircraft seat support 610. This allows the EDU 102 to be installed in existing aircraft without recertification of the seats.

In some applications, a carry-on baggage restraint bar 614 is disposed below the passenger seats 602, 604 and 606 so that passengers sitting behind the passenger seats 602, 604 and 606 are able to store and secure their carry-on luggage underneath the passenger seats 602, 604 and 606. The carry-on baggage restraint bar 614 is typically secured to lower portions of the passenger seats 602, 604 and 606 and/or to the seat supports 610. In one embodiment, the EDU 102 is installed behind the restraint bar 614. Because the EDU 102 is self-contained and does not extend across the baggage storage area of the aircraft seats, the baggage storage area under each aircraft seat 602, 604 and 606 is not obstructed by the installation of the EDU 102.

Figure 7:
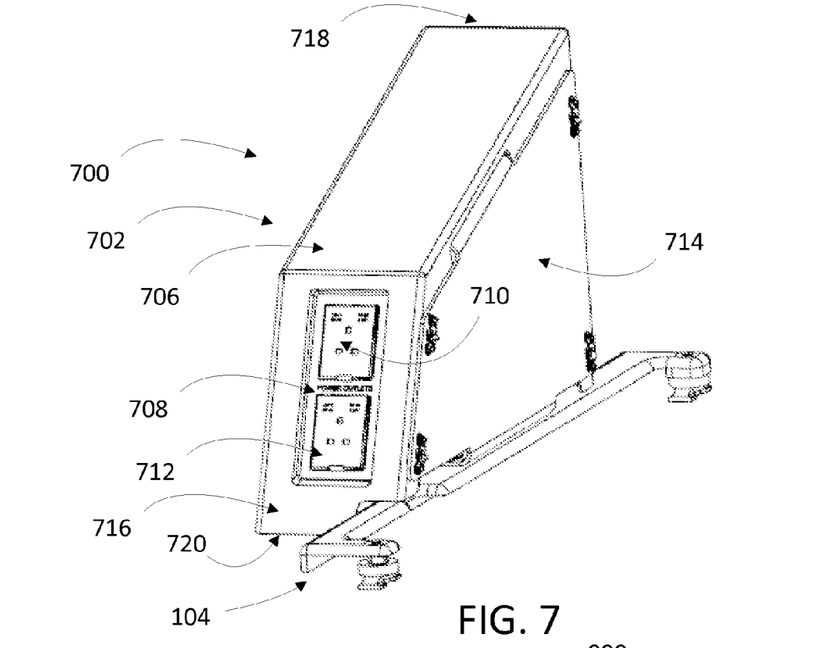
FIG. 7 depicts a rear view of one embodiment of a track mounted enclosure housing electronic components that is consistent with the present invention.

FIG. 7 depicts a rear view of one embodiment of a track mounted enclosure housing electronic components 700 that is consistent with the present invention. The track mounted enclosure housing electronic components 700 includes EDU 702 and a securing unit 104. The EDU 702 includes a housing 706, a connection plate 708 connected to the housing 706, a first power connection unit 710 and second power connection unit 712 removably affixed to the connection plate 708, and an access panel 714 connected to a side of the housing 706. The power connection units 710 and 712 may be any known power connection type including, but not limited to, a conventional three prong 115 VAC plug, a USB connector, a mini USB connector, or a direct current power connection. In one embodiment, a LED light may be positioned above the power connection unit 710 and 712.

The housing 706 is made from a rigid material such as hard plastic, steel, aluminum, a composite material or any other rigid material. In one embodiment, the rear side 716 of the housing 706 has a smaller height than the front side 718 of the housing 706. In another embodiment, the height of rear side 716 of the housing 706 is substantially the same height as the front side 718 of the housing 706. The securing unit 104 is affixed to the lower side 720 of the housing 706. In one embodiment, the securing unit 104 is connected to the centerline of the lower side 720 of the housing 706. In another embodiment, the securing unit 104 is connected to one side of the lower side 720 of the housing 706.

Figure 8:
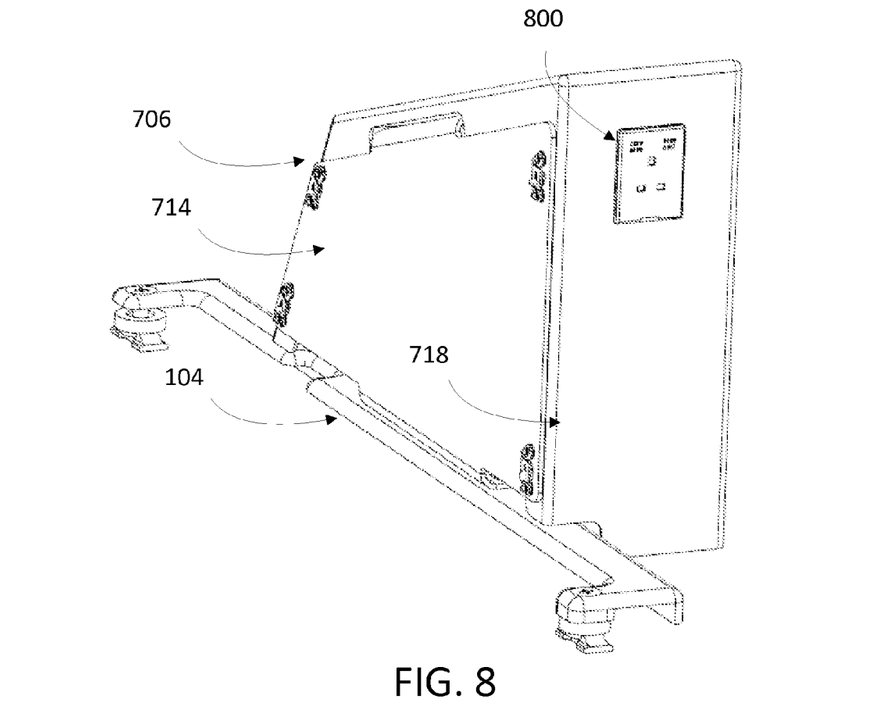
FIG. 8 depicts a front view of an electronic distribution unit from FIG. 7.

FIG. 8 depicts a front view of the EDU 702 of FIG. 7. The front side 718 of the housing 706 includes a third power connection unit 800 removably connected to the front side 718 of the housing 706. In one embodiment, the front side 718 of the housing 706 is substantially vertical. In another embodiment, the front side 718 of the housing 706 is angled towards the rear side 716 of the housing 706 by a predefined angle. In another embodiment, the front side 718 of the housing 706 is angled away from the rear side 716 of the housing 706 by a predefined angle. The first power connection unit 710, second power connection unit 712 and third power connection unit 800 may be conventional 115 VAC power outlets that include an indicator light indicating that the outlet is powered and a LED light that illuminates the power outlet. In another embodiment, each of the first power connection unit 710, second power connection unit 712 and third power connection unit 800 are the same type of outlet. In another embodiment, each of the first power connection unit 710, second power connection unit 712 and third power connection unit 800 are each different types of outlets.

Figure 9:
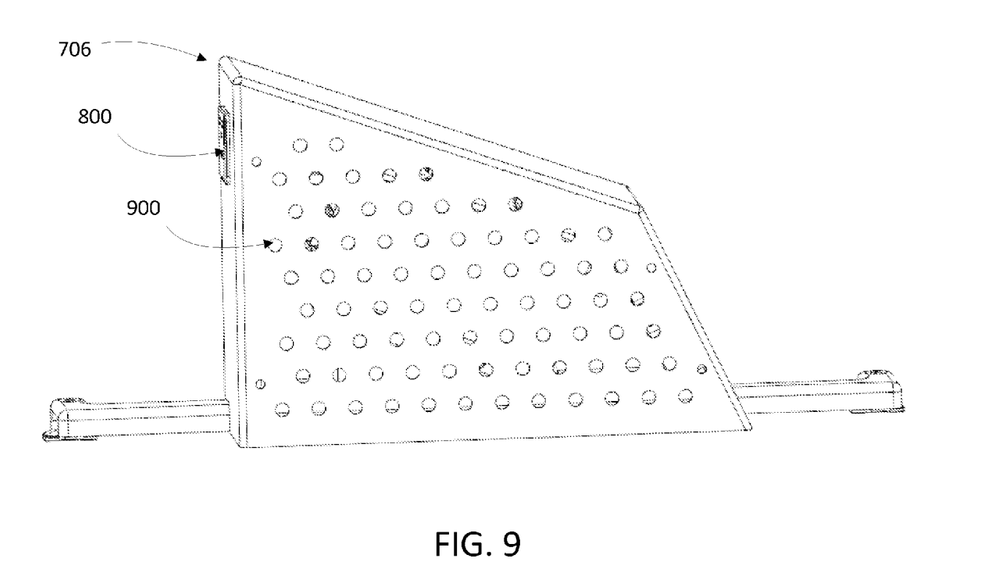
FIG. 9 depicts a first side view of a housing and a securing unit on the electronic distribution unit of FIG. 8.
Figure 10:
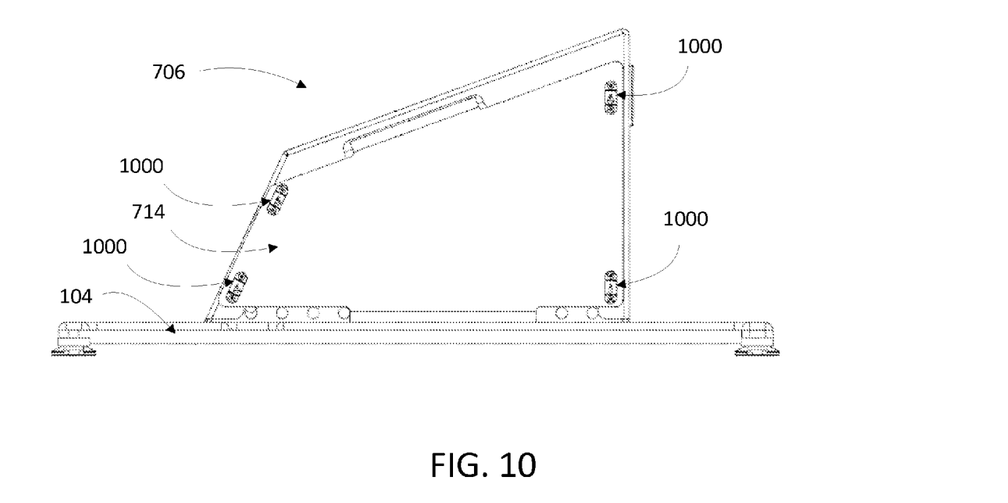
FIG. 10 depicts a second side view of the housing and securing unit of the electronic distribution unit of FIG. 8.

FIG. 9 depicts a first side view of the housing 706 and securing unit 104 of the EDU 702. The side of the housing 706 includes a plurality of holes 900. The holes 706 provide cooling to an electronic conversion unit (not shown) mounted inside the housing 706. FIG. 10 depicts a second side view of the housing 706 and securing unit 104 of the EDU 702 of FIG. 8. The housing 706 includes an access plate 714 removably attached to the side of the housing 706. The access plate 714 includes openings 1000 that are sized to engage holding units 1002 on the housing 706. In another embodiment, a slot is positioned on opposite sides of the housing 706 to allow the access plate 714 to slide into and out of the slot.

Figure 11:
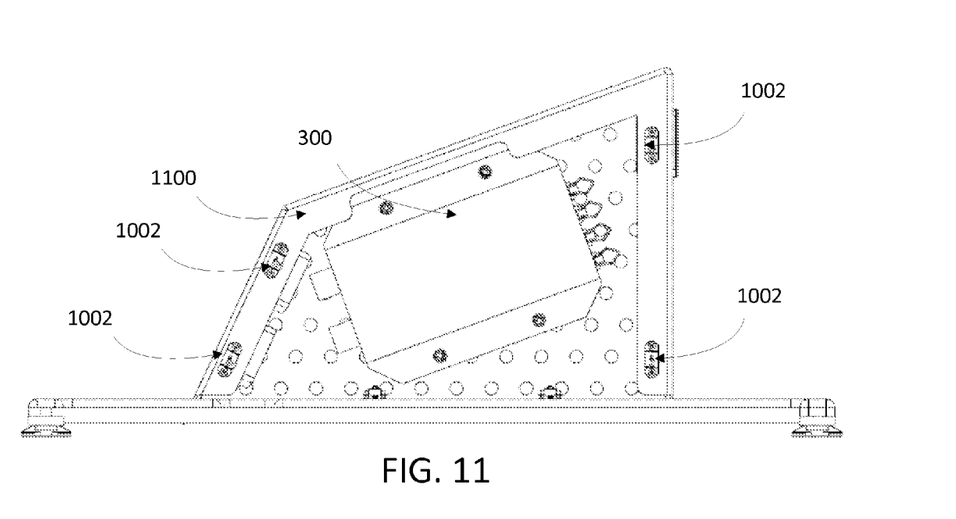
FIG. 11 depicts the electronic distribution unit of FIG. 8 with the access panel removed.

FIG. 11 depicts the electronic distribution unit of FIG. 8 with the access panel removed. The electronic connection unit 300 is positioned inside a cavity of the housing 706. A ridge 1100 along the edge of the opening of the cavity includes the holding units 1002. In one embodiment, the holding units 1002 are slots affixed along the length of the ridge 1100. The securing units 322 of the electronic connection unit 300 are removably affixed to a side surface of the housing 706.

It is to be understood that both the foregoing general description and the following detailed description are exemplary and are intended to provide further explanation of the invention claimed. The disclosed configuration is the preferred embodiment and is not intended to preclude functional equivalents to the various elements.

The accompanying drawings, which are incorporated in and constitute part of this specification, are included to illustrate and provide a further understanding of the invention. Together with the description, the drawings serve to explain the principles of the invention.

The invention claimed is:

1. A electrical distribution unit comprising:
    a housing;
    a securing unit including connecting extensions connected to a seat track and a bar parallel to the seat track that is connected to the housing;
    at least one outlet unit on the housing; and
    an electronic connection unit in the housing that is connected to a power distribution system;

wherein the outlet unit is electronically connected to the electronic distribution unit to provide power to a device connected to the at least one outlet unit.

2. The electrical distribution unit of claim 1 wherein each outlet unit is removably attached to the housing.

3. The electrical distribution unit of claim 2 wherein at least one outlet unit is attached to a surface of the housing facing the tail of the aircraft.

4. The electrical distribution unit of claim 2 wherein at least one outlet unit is attached to a surface of the housing facing the nose of the aircraft when installed.

5. The electrical distribution unit of claim 2 wherein at least one outlet unit is attached to a surface of the housing facing the nose of the aircraft when installed.

6. The electrical distribution unit of claim 5 including a lighting unit positioned on a top portion of the front surface of the housing above the outlet units.

7. The electrical distribution unit of claim 1 wherein at least one outlet unit includes a Universal Serial Bus Connection.

8. The electrical distribution unit of claim 1 wherein the securing unit is not in contact with the aircraft seat.

9. The electrical distribution unit of claim 1 wherein each outlet unit includes a data connection.

10. The electrical distribution unit of claim 1 wherein the housing unit is removably affixed to the securing unit.

11. A method of providing electrical power to passengers on an aircraft that includes the steps of:
providing an electronic connection unit in an internal cavity of a housing;
connecting the electronic connection unit to a power distribution system;
affixing at least one outlet unit to at least one surface of the housing providing a securing unit which includes a bar that is parallel to a seat track, and affixing the housing to the bar;
affixing connecting extensions on the securing unit to the seat track; and
providing power from the power distribution system to a device connected to the at least one outlet unit.

12. The method of claim 11 wherein each outlet unit is removably attached to the housing.

13. The method of claim 12 wherein at least one outlet unit is attached to a surface of the housing facing the tail of the aircraft.

14. The method of claim 12 wherein at least one outlet unit is attached to a surface of the housing facing the nose of the aircraft when installed.

15. The method of claim 12 wherein at least one outlet unit is attached to a surface of the housing facing the nose of the aircraft when installed.

16. The method of claim 15 including a lighting unit positioned on a top portion of the front surface of the housing above the outlet units.

17. The method of claim 11 wherein at least one outlet unit includes a Universal Serial Bus Connection.

18. The method of claim 11 wherein the securing unit is not in contact with the aircraft seat.

19. The method of claim 11 wherein each outlet unit includes a data connection.

20. The method of claim 11 wherein the housing unit is removably affixed to the securing unit.

* * * * *